United States Patent
Lee et al.

(10) Patent No.: US 11,706,449 B2
(45) Date of Patent: *Jul. 18, 2023

(54) METHOD AND DEVICE FOR INTRA-PREDICTION

(71) Applicant: ELECTRONICS AND TELECOMMUNICATIONS RESEARCH INSTITUTE, Daejeon (KR)

(72) Inventors: Jin Ho Lee, Daejeon-si (KR); Hui Yong Kim, Daejeon-si (KR); Sung Chang Lim, Daejeon-si (KR); Jong Ho Kim, Daejeon-si (KR); Ha Hyun Lee, Seoul (KR); Jin Soo Choi, Daejeon-si (KR); Jin Woong Kim, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,182

(22) Filed: Apr. 29, 2022

(65) Prior Publication Data

US 2022/0264149 A1 Aug. 18, 2022

Related U.S. Application Data

(63) Continuation of application No. 17/138,426, filed on Dec. 30, 2020, now Pat. No. 11,350,125, which is a
(Continued)

(30) Foreign Application Priority Data

Mar. 10, 2011 (KR) ........................ 10-2011-0021170
Mar. 12, 2012 (KR) ........................ 10-2012-0025095

(51) Int. Cl.
*H04N 19/593* (2014.01)

(52) U.S. Cl.
CPC .................................. *H04N 19/593* (2014.11)

(58) Field of Classification Search
None
See application file for complete search history.

(56) References Cited

U.S. PATENT DOCUMENTS

2008/0037624 A1 2/2008 Walker et al.
2009/0046781 A1 2/2009 Moriya et al.
(Continued)

FOREIGN PATENT DOCUMENTS

WO 2011110039 A1 9/2011

OTHER PUBLICATIONS

U.S. Appl. No. 14/002,393, Final Office Action dated Mar. 5, 2018.
(Continued)

*Primary Examiner* — Stuart D Bennett
(74) *Attorney, Agent, or Firm* — Shield Intellectual Property PC; Zhichong Gu

(57) ABSTRACT

The multi sample prediction method of the present invention comprises the steps of: determining a sample group consisting of a plurality of samples inside a decoding target block; determining a representative position corresponding to the sample group, inside the decoding target block; determining a representative prediction value for the sample group, on the basis of the determined representative position; and determining the determined representative prediction value as the final prediction value for each of the plurality of samples making up the sample group. The present invention enhances efficiency in encoding/decoding and reduces complexity thereof.

5 Claims, 13 Drawing Sheets

Related U.S. Application Data continuation of application No. 17/009,692, filed on Sep. 1, 2020, now Pat. No. 10,911,778, which is a continuation of application No. 16/374,685, filed on Apr. 3, 2019, now Pat. No. 10,798,414, which is a continuation of application No. 14/002,393, filed as application No. PCT/KR2012/001791 on Mar. 12, 2012, now abandoned.

(56) References Cited

U.S. PATENT DOCUMENTS

| | | |
|---|---|---|
| 2010/0061454 A1 | 3/2010 | Park et al. |
| 2010/0118943 A1* | 5/2010 | Shiodera ............... H04N 19/61 375/E7.246 |
| 2010/0290527 A1* | 11/2010 | Park ..................... H04N 19/176 375/E7.243 |
| 2011/0038415 A1 | 2/2011 | Min et al. |
| 2012/0082224 A1 | 4/2012 | Auwera et al. |
| 2012/0147955 A1 | 6/2012 | Budagavi |
| 2013/0336398 A1 | 12/2013 | Lee et al. |
| 2019/0230379 A1 | 7/2019 | Lee et al. |
| 2020/0404326 A1 | 12/2020 | Lee et al. |
| 2021/0120266 A1 | 4/2021 | Lee et al. |

OTHER PUBLICATIONS

U.S. Appl. No. 14/002,393, Final Office Action dated Feb. 15, 2019.
U.S. Appl. No. 14/002,393, Non-Final Office Action dated Jul. 11, 2018.
U.S. Appl. No. 16/374,685, Final Office Action dated Feb. 6, 2020.
U.S. Appl. No. 16/374,685, Non-Final Office Action dated Aug. 8, 2019.
U.S. Appl. No. 16/374,685, Non-Final Office Action dated Apr. 17, 2020.
U.S. Appl. No. 16/374,685, Notice of Allowance dated Jul. 10, 2020.
U.S. Appl. No. 17/009,692, Notice of Allowance dated Oct. 1, 2020.
U.S. Appl. No. 17/138,426, Non-Final Office Action dated Oct. 15, 2021.
U.S. Appl. No. 17/138,426, Notice of Allowance dated Feb. 1, 2022.
Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, 3rd Meeting: Guanzhou, CN, Oct. 7-15, 2010.
Zheng et al., "CE13: Mode Dependent Hybrid Intra Smoothing", Joint Collaborative Team on Video Coding (JCT-VC) of ITU-T SG16 WP3 and ISO/IEC JTC1/SC29/WG11, 4th Meeting: Daegu, KR, Jan. 20-28, 2011.

* cited by examiner

FIG. 4B

| X | UA | UB | UC | UD | UE | UF | UG | UH | UI | UJ | UK | UL | UM | UN | UO | UP |
|---|---|---|---|---|---|---|---|---|---|---|---|---|---|---|---|---|
| LA | (0,0) | (1,0) | (2,0) | (3,0) | (4,0) | (5,0) | (6,0) | (7,0) | | | | | | | | |
| LB | (0,1) | (1,1) | (2,1) | (3,1) | (4,1) | (5,1) | (6,1) | (7,1) | | | | | | 420 | | |
| LC | (0,2) | (1,2) | (2,2) | (3,2) | (4,2) | (5,2) | (6,2) | (7,2) | | | | | | | | |
| LD | (0,3) | (1,3) | (2,3) | (3,3) | (4,3) | (5,3) | (6,3) | (7,3) | | | | | | | | |
| LE | (0,4) | (1,4) | (2,4) | (3,4) | (4,4) | (5,4) | (6,4) | (7,4) | 410 | | | | | | | |
| LF | (0,5) | (1,5) | (2,5) | (3,5) | (4,5) | (5,5) | (6,5) | (7,5) | | | | | | | | |
| LG | (0,6) | (1,6) | (2,6) | (3,6) | (4,6) | (5,6) | (6,6) | (7,6) | | | | | | | | |
| LH | (0,7) | (1,7) | (2,7) | (3,7) | (4,7) | (5,7) | (6,7) | (7,7) | | | | | | | | |
| LI | | | | | | | | | | | | | | | | |
| LJ | | | | | | | | | | | | | | | | |
| LK | | | | | | | | | | | | | | | | |
| LL | | | | | | | | | | | | | | | | |
| LM | | | | | | | | | | | | | | | | |
| LN | | | | | | | | | | | | | | | | |
| LO | | | | | | | | | | | | | | | | |
| LP | | | | | | | | | | | | | | | | |

METHOD AND DEVICE FOR INTRA-PREDICTION

CROSS-REFERENCE TO RELATED APPLICATIONS

This application is a Continuation of U.S. patent application Ser. No. 17/138,426 filed on Dec. 30, 2020, which is a continuation of U.S. patent application Ser. No. 17/009,692 filed on Sep. 1, 2020, which is a continuation of U.S. patent application Ser. No. 16/374,685 filed on Apr. 3, 2019, which is a continuation of U.S. patent application Ser. No. 14/002,393 filed on Aug. 30, 2013, which is a National Stage of International Application No. PCT/KR2012/001791, filed Mar. 12, 2012, and published as WO2012/121575 on Sep. 13, 2012, which claims benefit under 35 U.S.C. § 119(a) of Korean Patent Application No. 10-2012-0025095 filed Mar. 12, 2012, and of Korean Patent Application No. 10-2011-0021170 filed Mar. 10, 2011, in the Korean Intellectual Property Office, the contents of all of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to image processing and, more particularly, to an intra prediction method and an apparatus thereof.

BACKGROUND

Recently, as broadcast service having high definition (HD) resolution has expanded internationally as well as domestically, many users become familiar to HD images (or pictures), and accordingly, a large number of organization or institutions are spurring the development of a next-generation imaging device. Also, as the interest in an HDTV and an ultra-high definition (UHD) having resolution of four-fold or greater than the HDTV is increasing, a compression technique with respect to more advanced HD images is required.

For image compression, an inter-prediction technique of predicting a sample value included in a current picture from a previous and/or subsequent picture temporally, an intra-prediction technique of predicting a sample value included in a current picture by using sample information included in the current picture, an entropy encoding technique of allocating a short code to a symbol having a high appearance frequency and a long code to a symbol having a low appearance frequency, and the like, may be used.

BRIEF DESCRIPTION OF THE DRAWINGS

FIGS. 4a and 4b are conceptual view explaining a method for determining a reference sample according to an embodiment of the present invention.

FIG. 9 is a conceptual view schematically showing an embodiment of a method of determining a representative prediction value of each sample group.

FIG. 11 is a conceptual view schematically showing another embodiment of a method of deriving a prediction value with respect to a plurality of samples of a sample group.

FIG. 12 is a conceptual view schematically showing another embodiment of a method of deriving a prediction value with respect to a plurality of samples of a sample group.

BRIEF SUMMARY OF INVENTION

Technical Problem

Figure 1:
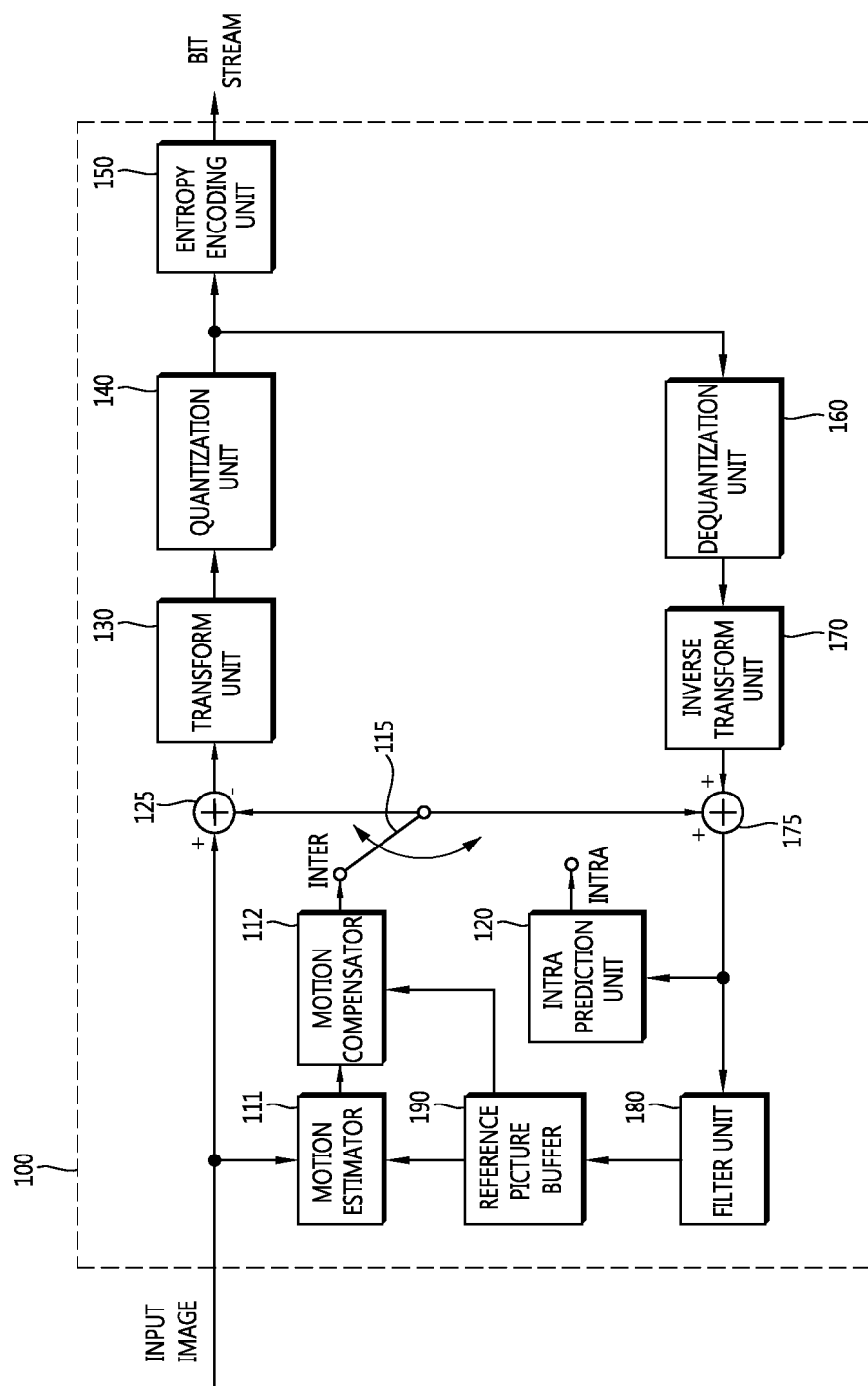
FIG. 1 is a schematic block diagram showing a configuration according to an embodiment of an image encoding apparatus to which the present invention is applied.

The present invention provides an image encoding method and apparatus capable of enhancing image encoding/decoding efficiency and reducing complexity.

The present invention also provides an image decoding method and apparatus capable of enhancing image encoding/decoding efficiency and reducing complexity.

The present invention also provides an intra-prediction method and apparatus capable of enhancing image encoding/decoding efficiency and reducing complexity.

The present invention also provides a multi-sample prediction method and apparatus capable of enhancing image encoding/decoding efficiency and reducing complexity.

Technical Solution

1. In an aspect, a multi-sample prediction method is provided. The method includes: determining a sample group comprised of a plurality of samples in a block to be decoded (or a decoding target block); determining a representative position corresponding to the sample group in the decoding target block; determining a representative prediction value with respect to the sample group based on the determined representative position; and determining the determined representative prediction value as a final prediction value with respect to each of the plurality of samples constituting the sample group.

2. In the aspect 1, the method may further include: determining whether to apply multi-sample prediction to the decoding target block by using a coding parameter of the decoding target block, wherein when it is determined to apply multi-sample prediction to the decoding target block, the steps that follow the sample group determining step may be sequentially performed and the coding parameter may include at least one of a size of the decoding target block and an intra prediction mode of the decoding target block.

3. In the aspect 1, in the step of determining a sample group, the size and shape of the sample group may be determined according to the coding parameter of the decoding target block, and the coding parameter may include at least one of the size of the decoding target block and the intra prediction mode of the decoding target block.

4. In the aspect 1, in the step of determining a representation position, one of positions of the plurality of samples constituting the sample group may be selected as a representative position with respect to the sample group.

5. In the aspect 1, in the step of determining a representation position, a middle position between a plurality of samples constituting the sample group may be determined as a representative position with respect to the sample group.

6. In the aspect 1, in the step of determining a representation position, a position of a sample existing outside the sample group in the decoding target block may be determined as a representative position with respect to the sample group.

7. In the aspect 1, the step of determining a representation prediction value may include: determining a reference position corresponding to the representative position based on the intra prediction mode of the decoding target block; and determining a representative prediction value with respect to the sample group based on the reference position.

8. In the aspect 7, when the determined reference position is the same as a position of a single reference sample with respect to the decoding target block, a sample value of the reference sample having the same position as the reference position may be determined as the representative prediction value in the step of determining a representative prediction value.

9. In the aspect 7, when the determined reference position is a position between a plurality of reference samples with respect to the decoding target block, a sample value of a reference sample positioned to be closest to a prediction direction of the decoding target block among the plurality of reference samples may be determined as the representative prediction value in the step of determining a representative prediction value.

10. In the aspect 7, when the determined reference position is a position between the plurality of reference samples with respect to the decoding target block, interpolation may be performed on the sample values of the plurality of reference samples to determine the representative prediction value in the step of determining a representative prediction value.

11. In the aspect 7, when the determined reference position is a position between the plurality of reference samples with respect to the decoding target block, a sample average value of the plurality of reference samples may be determined as the representative prediction value in the step of determining a representative prediction value.

12. In another aspect, an image decoding method is provided. The method includes: determining a sample group comprised of a plurality of samples in a block to be decoded (or a decoding target block); determining a representative position corresponding to the sample group in the decoding target block; determining a representative prediction value with respect to the sample group based on the determined representative position; determining the determined representative prediction value as a final prediction value with respect to each of the plurality of samples constituting the sample group; and generating a reconstructed image by using the final prediction value.

13. In another aspect 12, in the step of determining a sample group, the size and shape of the sample group may be determined according to the coding parameter of the decoding target block, and the coding parameter may include at least one of a size of the decoding target block and an intra prediction mode of the decoding target block.

14. In another aspect 12, in the step of determining a representation position, one of positions of the plurality of samples constituting the sample group may be selected as a representative position with respect to the sample group.

15. In another aspect 12, in the step of determining a representation position, a middle position between a plurality of samples constituting the sample group may be determined as a representative position with respect to the sample group.

16. In another aspect 12, in the step of determining a representation position, a position of a sample existing outside the sample group in the decoding target block may be determined as a representative position with respect to the sample group.

17. In another aspect 12, the step of determining a representation prediction value may include: determining a reference position corresponding to the representative position based on the intra prediction mode of the decoding target block; and determining a representative prediction value with respect to the sample group based on the reference position.

Advantageous Effects

By the image encoding method according to an embodiment of the present invention, an image encoding/decoding efficiency can be enhanced and complexity can be reduced.

By the image decoding method according to an embodiment of the present invention, an image encoding/decoding efficiency can be enhanced and complexity can be reduced.

By the intra-prediction method according to an embodiment of the present invention, an image encoding/decoding efficiency can be enhanced and complexity can be reduced.

By the multi-sample prediction method according to an embodiment of the present invention, an image encoding/decoding efficiency can be enhanced and complexity can be reduced.

DETAILED DESCRIPTION

Hereinafter, embodiments of the present invention will be described in detail with reference to the accompanying drawings. In describing the present invention, if a detailed explanation for a related known function or construction is considered to unnecessarily divert the gist of the present invention, such explanation will be omitted but would be understood by those skilled in the art.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

Also, elements of the embodiments of the present invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the present invention unless it diverts from the essence of the present invention.

Also, some of the elements may be optional to merely enhance the performance, rather than being essential to perform a constitutional function. The present invention may be implemented by using only the elements requisite for implement the essence of the present invention, excluding elements used to merely enhance the performance, and a structure including only the essential elements excluding the optional elements merely used to enhance the performance is also included in the scope of the present invention.

FIG. 1 is a schematic block diagram showing a configuration according to an embodiment of an image encoding apparatus to which the present invention is applied.

With reference to FIG. 1, the image encoding apparatus 100 includes a motion estimator 111, a motion compensator 112, an intra-prediction unit 120, a switch 115, a subtractor 125, a transform unit 130, a quantization unit 140, an entropy encoding unit 150, a dequantization unit 160, a inverse transform unit 170, an adder 175, a filter unit 180, and a reference picture buffer 190.

The image encoding apparatus 100 may perform encoding on an input image in an intra mode or an inter mode and output a bit stream. The intra prediction refers to intra-screen prediction, and the inter prediction refers to an inter-screen prediction. In the case of the intra mode, a switch 115 may be changed into intra, and in the case of the inter mode, the switch 115 may be changed into inter. The image encoding apparatus 100 may generate a predictive block with respect to an input block of the input image, and then, encode a difference between the input block and the predictive block.

In the case of the intra mode, the intra prediction unit 120 may perform spatial prediction by using a sample value of an already encoded block around a current block to generate a predictive block.

In the case of the inter mode, the motion estimator 111 may search a region which is best matched to an input block from a reference image stored in the reference picture buffer 190 to obtain a motion vector during a motion prediction process. The motion compensator 112 may perform motion compensation by using the motion vector to generate a predictive block.

The subtractor 125 may generate a residual block by a difference between the input block and the generated predictive block. The transform unit 130 may perform transform on the residual block to output a transform coefficient. The quantization unit 140 quantizes the input transform coefficient according to a quantization parameter to output a quantized coefficient.

The entropy encoding unit 150 may perform entropy encoding based on values calculated by the quantization unit 140, an encoding parameter value calculated during an encoding process, and the like, to output a bit stream.

When the entropy encoding is applied, a smaller number of bits are allocated to a symbol having a high generation probability and a larger number of bits are allocated to a symbol having a low generation probability to represent the symbols, thereby reducing the size of a bit stream with respect to the symbols to be encoded (or encoding target symbols). Thus, compression performance of video encoding can be enhanced through entropy encoding. For entropy encoding, the entropy encoding unit 150 may use an encoding method such as exponential golomb, CAVLC (Context-Adaptive Variable Length Coding), CABAC (Context-Adaptive Binary Arithmetic Coding), or the like.

The image encoding apparatus according to an embodiment of the present invention illustrated in FIG. 1 performs inter-predictive coding, namely, inter-screen predictive coding, so a currently encoded image is required to be decoded and stored so as to be used as a reference image. Thus, the quantized coefficient is dequantized by the dequantization unit 160 and inversely transformed by the inverse transform unit 170. The dequantized and inversely transformed coefficient is added to the predictive block through the adder 175 to generate a reconstructed block.

The reconstructed block is processed through the filter unit 180, and the filter unit 180 may apply one or more of a deblocking filter, an SAO (Sample Adaptive Offset), and an ALF (Adaptive Loop Filter) to a reconstructed picture. The filter unit 180 may also be called an adaptive in-loop filter. The deblocking filter may remove block distortion generated in a boundary between blocks. The SAO may add an appropriate offset value to a sample value in order to compensate for a coding error. The ALF may perform filtering based on a value obtained by a reconstructed image and the original image, and may perform filtering only when high efficiency is applied. The reconstructed block processed through the filter unit 180 may be stored in the reference picture buffer 190.

Figure 2:
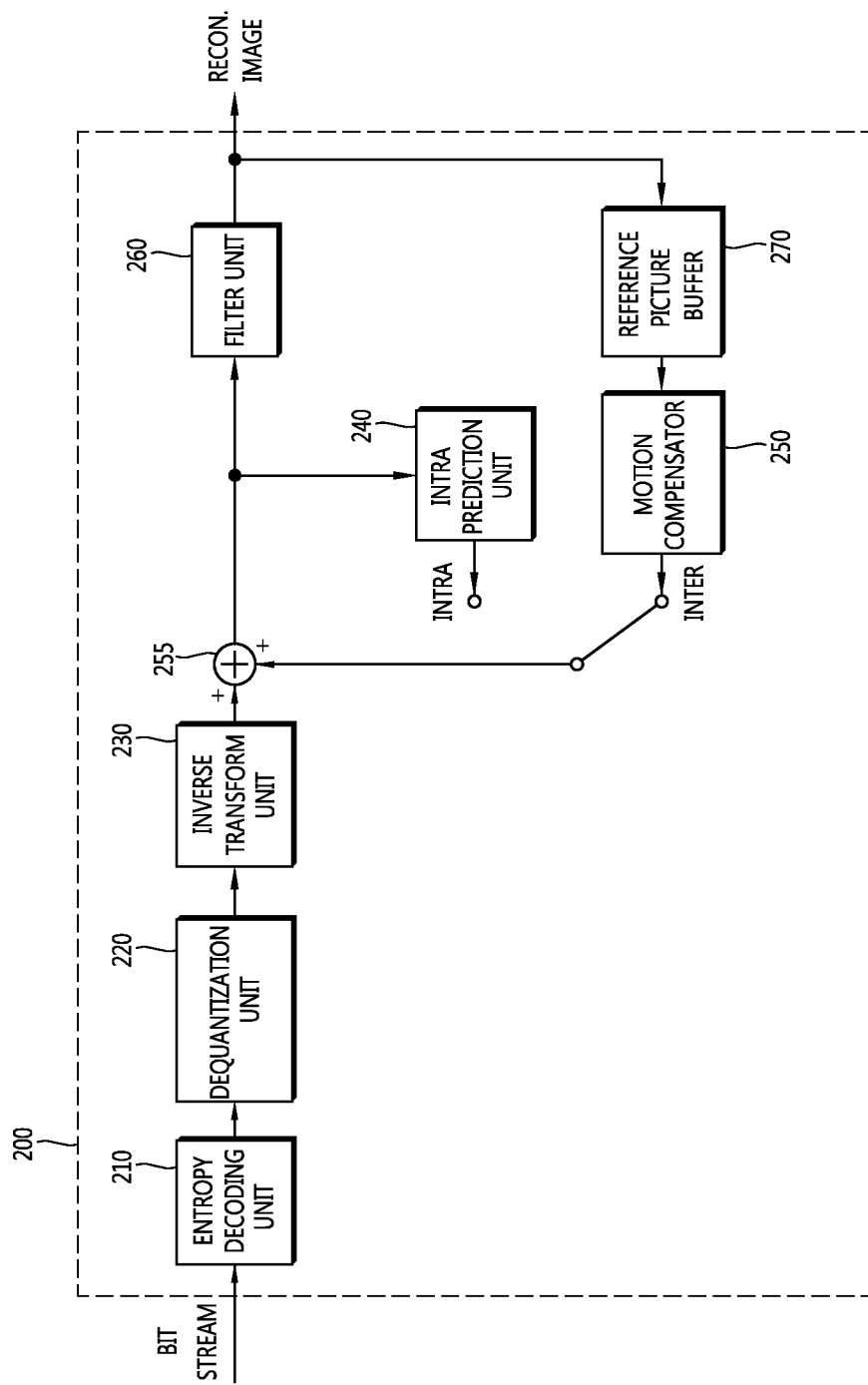
FIG. 2 is a schematic block diagram showing a configuration according to an embodiment of an image decoding apparatus to which the present invention is applied.

FIG. 2 is a schematic block diagram showing a configuration according to an embodiment of an image decoding apparatus to which the present invention is applied.

With reference to FIG. 2, an image decoding apparatus 200 includes an entropy decoding unit 210, a dequantization unit 220, a inverse transform unit 230, an intra prediction unit 240, a motion compensator 250, an adder 255, a filter unit 260, and a reference picture buffer 270.

The image decoding apparatus 200 may receive a bit stream output from an encoder, perform decoding on the received bit stream in an intra mode or inter mode, and output a reconfigured image, i.e., a reconstructed image. In the case of the intra mode, a switch may be changed into intra, and in the case of the inter mode, the switch may be changed into inter. The image decoding apparatus 200 may obtain a residual block from the received bit stream, generate a predictive block, and add the residual block and the predictive block to generate a reconfigured block, i.e., a reconstructed block.

The entropy decoding unit 210 may perform entropy decoding on the input bit stream according to a probability distribution to generate symbols including a symbol having a quantized coefficient form. The entropy decoding method is similar to the foregoing entropy encoding method.

When the entropy decoding method is applied, a small number of bits are allocated to a symbol having a high generation probability, and a large number of bits are allocated to a symbol having a low generation probability to represent symbols, thus reducing the size of a bit stream with respect to the respective symbols. Thus, compression performance of image decoding can be enhanced through the entropy decoding method.

The quantized coefficient is dequantized by the dequantization unit 220, inversely transformed by the inverse transform unit 230, and according to the results of the dequantization/inverse transform of the quantized coefficient, a residual block may be generated.

In the case of the intra mode, the intra prediction unit 240 may perform spatial prediction by using a sample value of the already coded blocks around a current block to generate a predictive block. In the case of the inter mode, the motion compensator 250 may perform motion compensation by using a motion vector and a reference image stored in the reference picture buffer 270 to generate a predictive block.

The residual block and the predictive block may be added by the adder 255, and the added blocks may be processed by the filter unit 260. The filter unit 260 may apply one or more of a deblocking filter, an SAO, and an ALF to the reconstructed block or a reconstructed picture. The filter unit 260 may output the reconfigured image, i.e., the reconstructed image. The reconstructed image may be stored in the reference picture buffer 270 so as to be used for inter prediction.

Hereinafter, a block refers to a unit of image encoding and decoding. In image encoding and decoding, an encoding or decoding unit refers to a divided unit when an image is segmented to be encoded or decoded, so it may be called a coding unit (CU), a prediction unit (PU), a transform unit (TU), or the like. A single block may be further divided into sub-blocks having a smaller size. Also, hereinafter, a block to be encoded/decoded (or an encoding/decoding target block) may refer to a coding unit or a prediction unit as a current encoding/decoding target. The size of the encoding/decoding target block may be, for example, 2×2, 4×4, 8×8, 16×16, 32×32, 64×64, 128×128, or the like.

Meanwhile, the intra prediction may be performed according to an intra prediction mode of an encoding/decoding target block. The number of intra prediction modes of the encoding/decoding target block may be a fixed value, and the fixed value may be 3, 4, 5, 9, 17, 18, 34, 35, or the like. Each intra prediction mode may indicate a single prediction direction.

The encoder and the decoder may perform intra prediction by performing interpolation on a reconstructed sample corresponding to an encoding/decoding target sample. Here, the reconstructed sample corresponding to the encoding/decoding target sample may be determined according to an intra prediction mode (and/or a prediction direction) of the encoding/decoding target block to which the encoding/decoding target sample belongs. Here, as the size of the encoding/decoding target block is increased, the number of encoding/decoding target samples may be increased and the number of times of performing interpolation may be increased. Thus, the foregoing intra prediction method may have a problem in which the coding efficiency over complexity is not high in a block in which encoding/decoding target samples have high correlationship.

Thus, an intra prediction method of determining a representative prediction value with respect to a sample group comprised of a plurality of samples and predicting a plurality of samples of the sample group by using the determining representative prediction value at a time to thus reduce an amount of calculation may be provided. Namely, in performing intra prediction on samples in an encoding/decoding target block, the encoder and the decoder may determine a sample group of the encoding/decoding target block and a representative prediction value and predict a plurality of the sample group by using the determining representative prediction value. In this case, since the number of times of performing an interpolation process is reduced, the amount of calculation required for intra prediction can be reduced. Hereinafter, the intra prediction method of predicting a plurality of samples of a sample group by using a representative prediction value will be referred to as multi-sample prediction.

In the embodiments described hereafter, the encoder will be mainly described. However, this is merely for the sake of explanation and may also be applied in the same manner to the decoder unless otherwise mentioned. In this case, an encoding target block described hereafter may be interpreted as a decoding target block.

Figure 3:
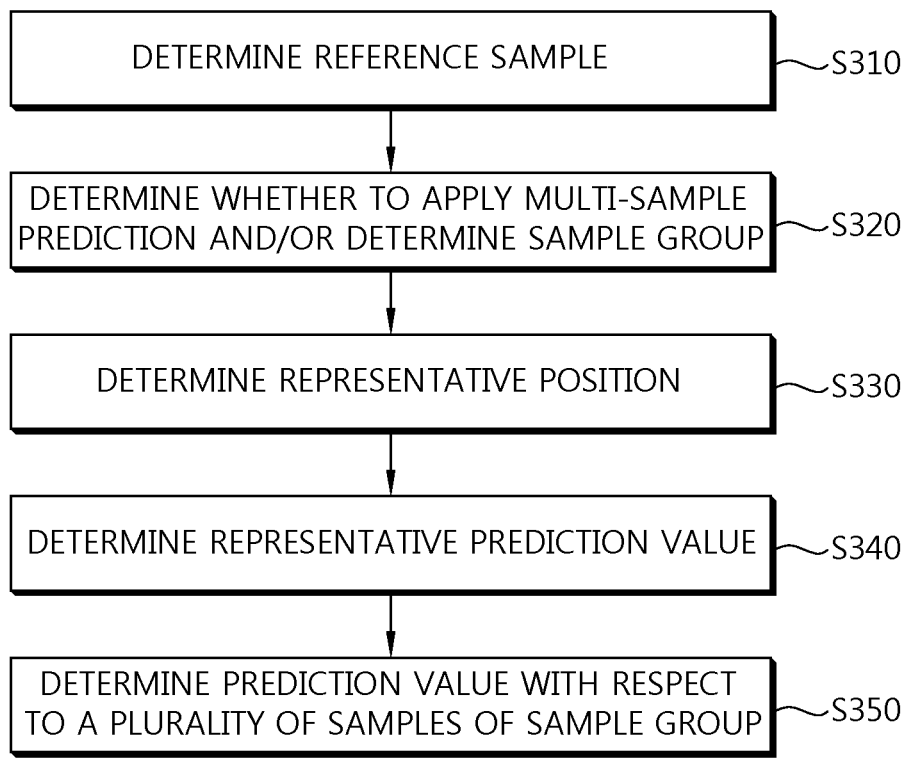
FIG. 3 is a flow chart illustrating a process of an intra-prediction method according to an embodiment of the present invention.

FIG. 3 is a flow chart illustrating a process of an intra-prediction method according to an embodiment of the present invention.

With reference to FIG. 3, the encoder may determine a reference sample used for intra prediction of an encoding target block (S310). Here, the reference sample may be determined according to an intra prediction mode and/or a prediction direction of the encoding target block.

The encoder may encode information regarding the intra prediction mode, include the encoded information in a bit stream, and transmit the same to the decoder. Then, the decoder may perform parsing on the received bit stream to derive an intra prediction mode (and/or a prediction direction), and perform intra prediction on the decoding target block based on the derived intra prediction mode (and/or the prediction direction).

With reference to FIG. 3, the encoder may determine whether to apply multi-sample prediction, the size of a sample group, and/or a shape of a sample group according to an encoding parameter of the encoding target block (S320). Here, the sample group may correspond to an application unit of multi-sample prediction.

The encoding parameter may include information that may be inferred (or analogized) during the encoding or decoding process, as well as information which is encoded together with a syntax element and transmitted to the decoder, and may refer to information required for encoding or decoding an image.

The encoding parameter may include, for example, the size of the encoding target block and/or the prediction mode of the encoding target block. Namely, the encoder may differently determine whether to apply multi-sample prediction, the size of the sample group and/or the shape of the sample group according to the size of the encoding target block and/or the prediction mode of the encoding target block.

When it is determined to apply multi-sample prediction, the encoder may determine a representative position with respect to each sample group of the encoding target block (S330). Here, the representative position may be determined according to, for example, positions of a plurality of samples constituting each sample group.

For example, the encoder may determine a position of a single among the plurality of samples constituting the sample group, as a representative position with respect to the sample group. Also, the encoder may determine a middle position of the plurality of samples constituting the sample group, as a representative position with respect to the sample group. Also, the encoder may determine a position existing outside the sample group within the encoding target block, as a representative position with respect to the sample group.

With reference to FIG. 3, the encoder may determine a representative prediction value with respect to each sample group by using at least one of reference samples with respect to the encoding target block based on the representative position with respect to each sample group (S340). When the representative prediction value is determined, the encoder may determine a sample prediction value with respect to each of the plurality of samples of the sample group corresponding to the representative prediction value by using the determined representative prediction value (S350). For example, a prediction value with respect to each of the plurality of samples constituting a single sample group may be determined to be the same value as the representative prediction value corresponding to the sample group. Namely, the representative prediction value may be used as a prediction value of the plurality of samples of the corresponding sample group.

A detailed embodiment of the foregoing respective steps (S310, S320, S330, S340, and S350) will be described later.

Figure 4A:
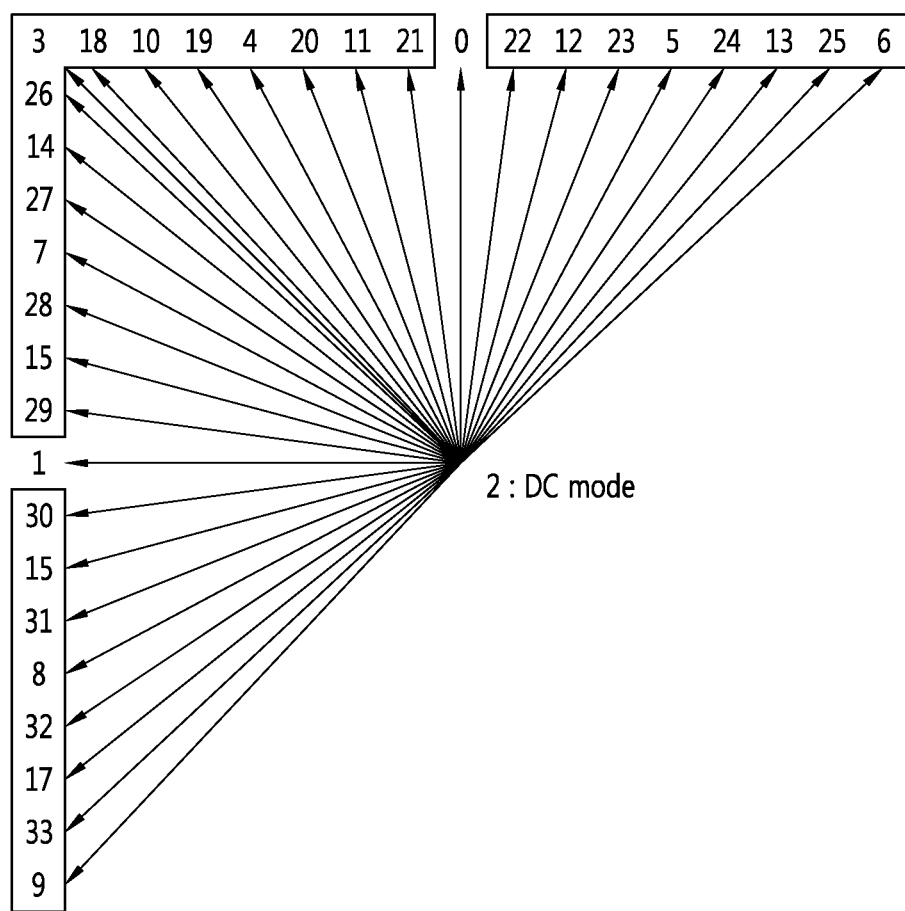

FIGS. 4a and 4b are conceptual view explaining a method for determining a reference sample according to an embodiment of the present invention.

As described above, the intra prediction may be performed according to the intra prediction mode (and/or prediction direction) of the encoding/decoding target block. The number of intra prediction modes (and or prediction directions) of the encoding/decoding target block may be a fixed value, and the fixed value may be 3, 4, 5, 9, 17, 18, 34, 35, or the like. Each of the intra prediction modes may indicate a single prediction direction.

FIG. 4a schematically shows an embodiment of prediction directions of intra prediction modes and mode values allocated to the respective prediction directions when thirty-four prediction modes are used. In FIG. 4a, a plurality of intra prediction modes are illustrated and each of the intra prediction modes may have different prediction directions. The numbers allocated to the respective intra prediction modes are mode values.

With reference to FIG. 4a, when the mode value is 0, prediction may be performed in a vertical direction by using pixel values of an adjacent block, and when the mode value is 1, prediction may be performed in a horizontal direction by using pixel values of an adjacent block. Also, in the other remaining modes, prediction may be performed by using pixel values of an adjacent block according to corresponding angles.

FIG. 4b illustrates an encoding target block 410 and a reference sample candidate 420. Each (x,y) illustrated in the encoding target block 410 may indicate coordinates of the encoding target sample. In the embodiment illustrated in FIG. 4b, the size of the encoding target block is assumed to be 8×8.

As mentioned above, the reference sample used for intra prediction of the encoding target block 410 may be determined to be different according to an intra prediction mode and/or prediction direction of the encoding target block. Here, the intra prediction mode of the encoding target block may be determined, for example, as shown in FIG. 4a. Table 1 below shows the reference sample determined according to the intra prediction mode of the encoding target block according to an embodiment of the present invention.

TABLE 1

| Prediction mode | Reference sample |
|---|---|
| 0 | UA~UH |
| 1 | LA~LH |
| 2 | UA~UH, LA~LH |
| 3, 18, 10, 19, 4, 20, 11, 21, 26, 14, 27, 7, 28, 15, 29 | UA~UH LA~LH, X |
| 22, 12, 23, 5, 24, 13, 25, 6 | UA~UP |
| 30, 16, 31, 8, 32, 17, 33, 9 | LA~LP |

With reference to Table 1, when a mode value of the prediction mode of the encoding target block is 0, samples UA to UH may be determined as reference samples of the encoding target block in FIG. 4b. Also, when a mode value of the prediction mode of the encoding target block is 1, samples LA to LH may be determined as reference samples of the encoding target block in FIG. 4b. Also, in the other prediction modes, reference samples of the encoding target block may be determined according to corresponding angles.

The encoder may perform filtering on the determined reference samples. In this case, whether to apply filtering and an application range may be determined according to a size and/or a prediction mode of the encoding target block.

Figure 5:
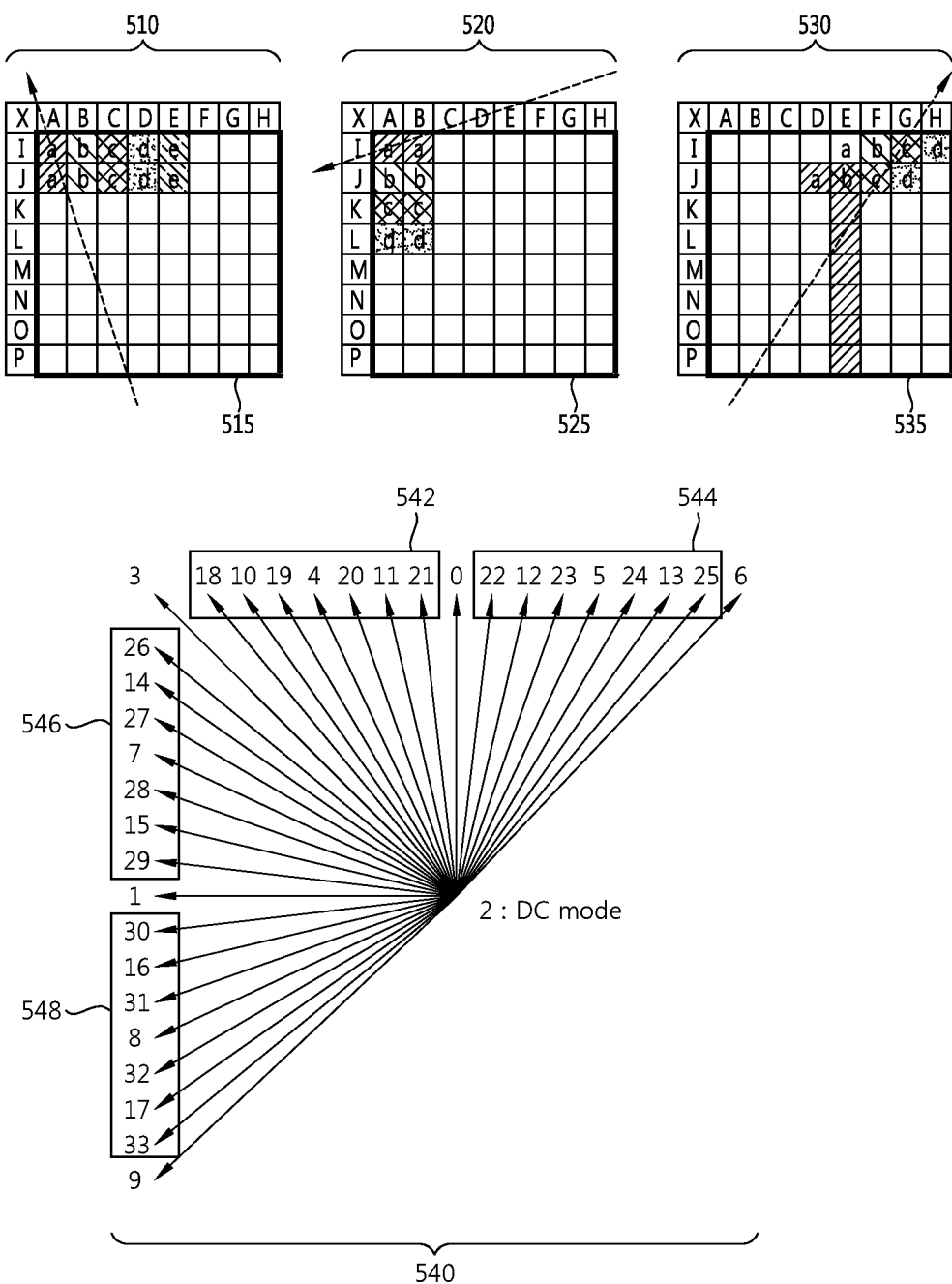
FIG. 5 is a conceptual view schematically showing an embodiment of a method for determining whether to apply multi-sample prediction and determining a sample group according to an embodiment of the present invention.

FIG. 5 is a conceptual view schematically showing an embodiment of a method for determining whether to apply multi-sample prediction and determining a sample group according to an embodiment of the present invention.

The encoder may determine a representative prediction value with respect to the sample group comprised of a plurality of samples, and estimate the plurality of samples of the sample group by using the determined representative prediction value at a time. As mentioned above, such a prediction method may be referred to as multi-sample prediction.

The encoder may determine whether to apply multi-sample prediction, a size of a sample group, and/or a shape of the sample group according to the size of the encoding target block and at least one of intra prediction modes of the encoding target block. In this case, whether to apply multi-sample prediction, a size of a sample group, and/or a shape of the sample group may be determined by a certain fixed value according to the size of the encoding target block and/or the intra prediction mode of the encoding target block.

Table 2 below shows the size of the encoding target block, whether to apply multi-sample prediction according to the intra prediction mode, and the size of the sample group according to an embodiment of the present invention.

TABLE 2

| Block size | Prediction mode | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| 4 × 4 | — | — | — | — | — | — | — | — | — | — | — | — | — | — | — | — | — |
| 8 × 8 | — | — | — | — | — | — | — | — | — | — | — | — | — | — | — | — | — |
| 16 × 16 | — | — | — | — | — | — | — | — | — | — | — | — | — | — | — | — | — |
| 32 × 32 | — | — | — | — | 2 | 2 | — | 2 | 2 | — | 2 | 2 | 2 | 2 | 2 | 2 | 2 |
| 64 × 64 | — | — | — | — | 4 | 4 | — | 4 | 4 | — | 4 | 4 | 4 | 4 | 4 | 4 | 4 |

TABLE 2-continued

| Block size | Prediction mode | | | | | | | | | | | | | | | | |
|---|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 | 33 |
| 4 × 4 | — | — | — | — | — | — | — | — | — | — | — | — | — | — | — | — | — |
| 8 × 8 | — | — | — | — | — | — | — | — | — | — | — | — | — | — | — | — | — |
| 16 × 16 | — | — | — | — | — | — | — | — | — | — | — | — | — | — | — | — | — |
| 32 × 32 | 2 | 4 | 2 | 2 | 2 | 2 | 2 | 2 | 4 | 4 | 2 | 2 | 2 | 2 | 2 | 2 | 4 |
| 64 × 64 | 4 | 4 | 4 | 4 | 4 | 4 | 4 | 4 | 4 | 4 | 4 | 4 | 4 | 4 | 4 | 4 | 4 |

In Table 2, portions indicated by '-' may be portions to which multi-sample prediction is not applied. Also, numbers allocated according to the sizes of the encoding target block and the prediction modes may represent the size of sample groups, namely, the number of a plurality of samples constituting sample groups.

For example, when the size of the encoding target block is 16×16 and the intra prediction mode of the encoding target block is 15, multi-sample prediction may not be applied to the encoding target block. Also, when the size of the encoding target block is 32×32 and the intra prediction mode of the encoding target block is 18, multi-sample prediction may be applied to the encoding target block. In this case, the size of the sample group used for multi-sample prediction may be 4.

Also, in determining the sample group, the encoder may determine the shape of the sample group differently according to the prediction mode (and/or prediction direction) of the encoding target block. Here, the shape of the sample group may indicate positions of the plurality of samples constituting the sample group.

FIG. 5 shows shapes of sample groups according to intra prediction modes. In FIGS. 5, 515, 525, and 535 indicate encoding target blocks, respectively. In FIG. 5, it is assumed that the size of the encoding target block is 8×8 and the size of the sample group is 2. Also, in FIG. 5, in 510, 520, and 530, two pixels represented by 'a' may constitute a single sample group. Also, pixels represented by 'c', 'd', and 'e' may also constitute a sample group in the same manner, respectively.

In the embodiments described hereafter, respective pixels in the encoding target block may be represented by coordinates [x,y]. Here, the x value may be increased toward the right side on the coordinate axis, and the y value may be increased downward.

Also, in FIG. 5, in 540, a prediction mode group comprised of prediction modes 542 between a prediction mode (mode value 3) in a direction of a left upper end and a prediction mode (mode value 0) in a vertical direction and prediction modes 544 between a prediction mode (mode value 6) in a direction of right upper end and the prediction mode (mode value 0) in the vertical direction is referred to as a vertical direction prediction mode group (Group vert). Meanwhile, a prediction mode group comprised of prediction modes 546 between the prediction mode (mode value 3) in the direction of the left upper end and a prediction mode (mode value 1) in a horizontal direction and prediction modes 548 between a prediction mode (mode value 9) in a direction of a left lower end and the prediction mode (mode value 1) in the horizontal direction is referred to as a horizontal directional prediction mode group (Group_hor).

For example, it is assumed that an intro prediction mode of an encoding target block is a prediction mode corresponding to the vertical directional prediction mode group. In this case, the encoder may determine a shape of a sample group as shown in 510 in FIG. 5. Namely, the encoder may determine two samples contiguous up and down as a single sample group. In this case, when coordinates of one sample of the sample group is [x,y], coordinates of the other sample may be [x,y+1].

In another example, it is assumed that an intra prediction mode of an encoding target block is a prediction mode corresponding to the horizontal directional prediction mode group. In this case, the encoder may determine a shape of a sample group as shown in 510 in FIG. 5. Namely, the encoder may determine two samples contiguous left and right as a single sample group. In this case, when coordinates of one sample of the sample group is [x,y], coordinates of the other sample may be [x+1,y].

In another example, the encoder may determine two samples contiguous in a diagonal direction as shown in 530 in FIG. 5 as a single sample group. In this case, when coordinates of one sample of the sample group is [x,y], coordinates of the other sample may be [x−1,y+1].

Figure 6:
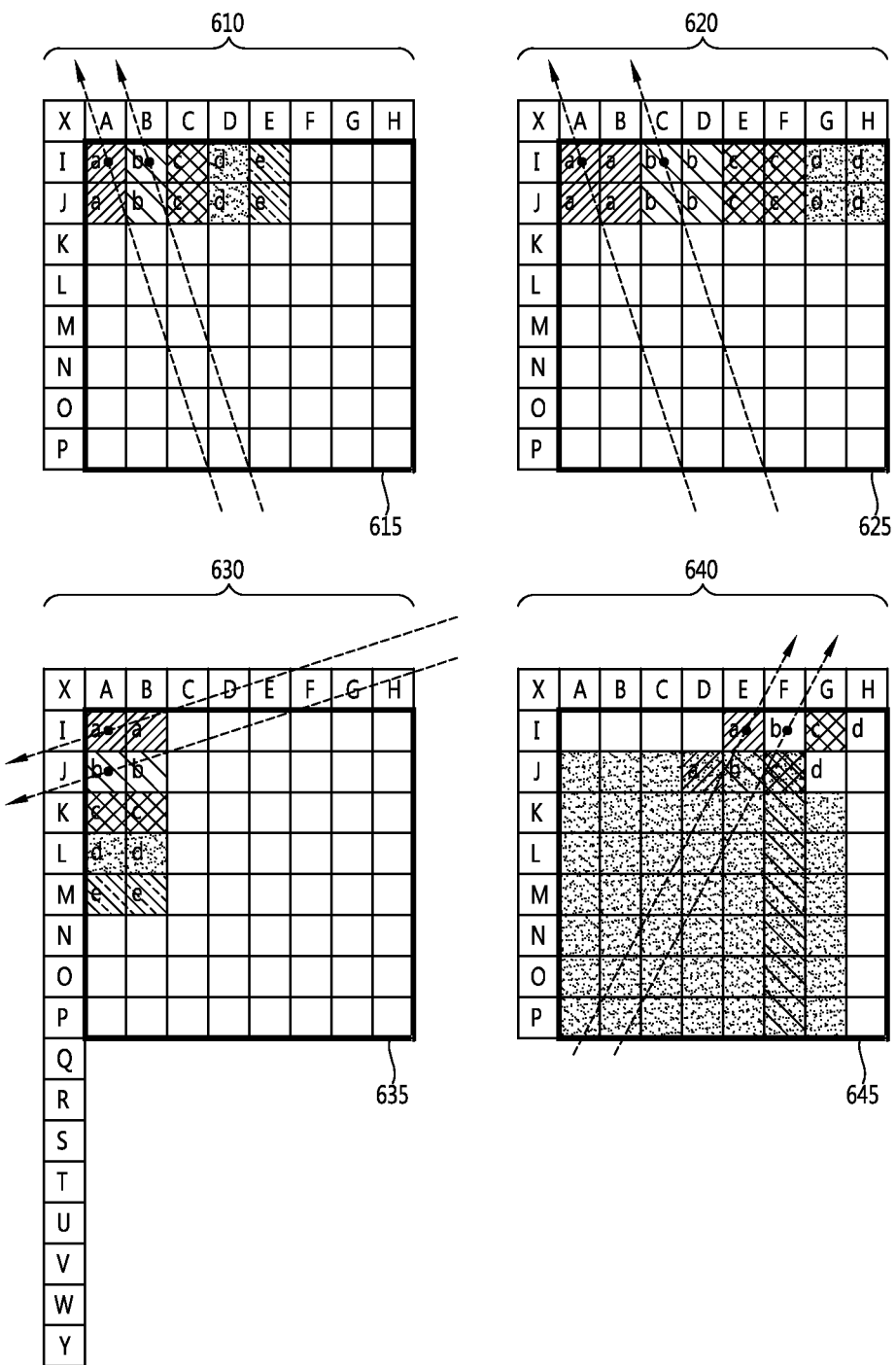
FIG. 6 is a conceptual view schematically showing an embodiment of a method for determining a representative position of each sample group according to an embodiment of the present invention.

FIG. 6 is a conceptual view schematically showing an embodiment of a method for determining a representative position of each sample group according to an embodiment of the present invention.

In FIGS. 6, 615, 625, 635, and 645 represent encoding target blocks, respectively, and the size of the respective encoding target blocks is assumed to be 8×8. In 610, 630, and 640 in FIG. 6, two pixels represented by 'a' may constitute a single sample group, and in 620 in FIG. 6, four pixels represented by 'a' may constitute a single sample group. Also, pixels represented by 'c', 'd', and e' may also constitute a sample group in the same manner, respectively.

As mentioned above, when it is determined to apply multi-sample prediction, the encoder may determine a representative position with respect to each sample group in the encoding target block. Here, the representative position may be determined according to positions of the plurality of samples constituting each sample group.

In an embodiment, the encoder may determine a position of a single sample among the plurality of samples constituting a sample group, as a representative position with respect to the sample group. In this case, for example, a single sample corresponding to the representative position may be a sample closest to a reference sample among the plurality of samples constituting the sample group. Also, in another example, a single sample corresponding to the representative position may be a sample existing at a particular position among the plurality of samples.

With reference to 610, 620, 630, and 640 in FIG. 6, the encoder may determine a position of a sample closest to the reference sample in the sample group indicated by 'a' as a representative position with respect to the 'a' sample group. Also, the encoder may determine a position of a sample closest to the reference sample in the sample group indicated by 'b' as a representative position with respect to the 'b' sample group. In FIG. 6, the representative position with respect to the 'a' sample group and the representative position with respect to the 'b' sample group are illustrated as black dots. Also, the encoder may determine representative positions with respect to the sample groups corresponding to 'c', 'd', and e' in the same manner.

Figure 7:
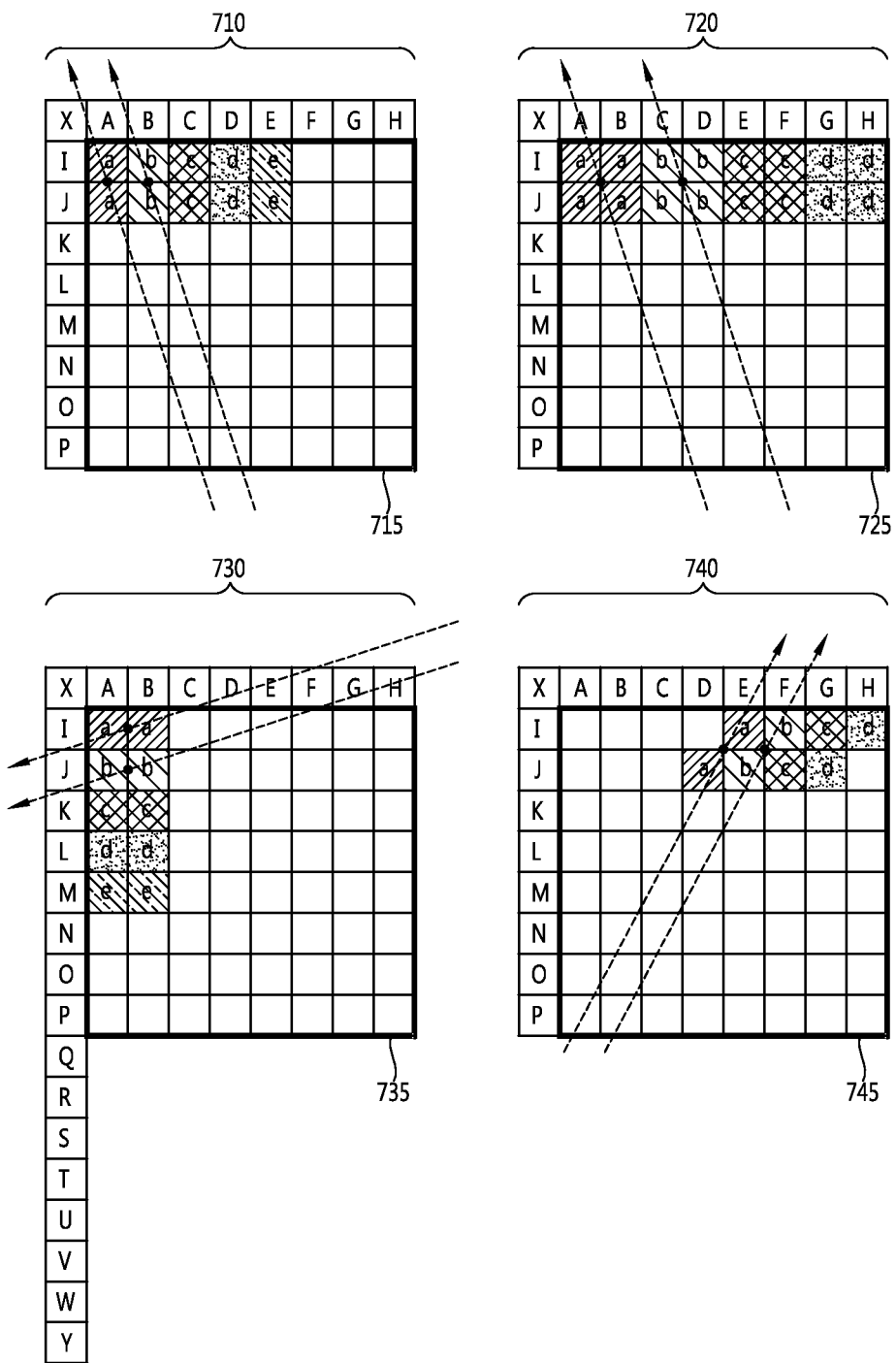
FIG. 7 is a conceptual view schematically showing another embodiment of a method for determining a representative position of each sample group according to an embodiment of the present invention.

FIG. 7 is a conceptual view schematically showing another embodiment of a method for determining a representative position of each sample group according to an embodiment of the present invention.

In FIGS. 7, 715, 725, 735, and 745 represent encoding target blocks, respectively, and the size of the respective encoding target blocks is assumed to be 8×8. In 710, 730, and 740 in FIG. 7, two pixels represented by 'a' may constitute a single sample group, and in 720 in FIG. 7, four pixels represented by 'a' may constitute a single sample group. Also, pixels represented by 'b', 'c', 'd', and e' may also constitute a sample group in the same manner, respectively.

As mentioned above, when it is determined to apply multi-sample prediction, the encoder may determine a representative position with respect to each sample group in the encoding target block. Here, the representative position may be determined according to positions of the plurality of samples constituting each sample group. In this case, the encoder may determine a middle position between the plurality of samples constituting a sample group, as a representative position with respect to the sample group.

With reference to 710, 720, 730, and 740 in FIG. 6, the encoder may determine a middle position of the plurality of samples constituting the sample group indicated by 'a', as a representative position with respect to the 'a' sample group. For example, in 710 in FIG. 7, when coordinates of two samples of the 'a' sample group are [x,y], [x,y+1], respectively, a representative position may be determined to be [x,y+½]. Also, the encoder may determine a middle position of the plurality of samples constituting the sample group indicated by 'b' as a representative position with respect to the 'b' sample group. For example, in 710 in FIG. 7, when coordinates of two samples of the 'b' sample group are [x+1,y], [x+1,y+1], respectively, a representative position may be determined to be [x+1,y+½]. In FIG. 7, the representative position with respect to the 'a' sample group and the representative position with respect to the 'b' sample group are illustrated as black dots. Also, the encoder may determine representative positions with respect to the sample groups corresponding to 'c', 'd', and e' in the same manner.

Figure 8:
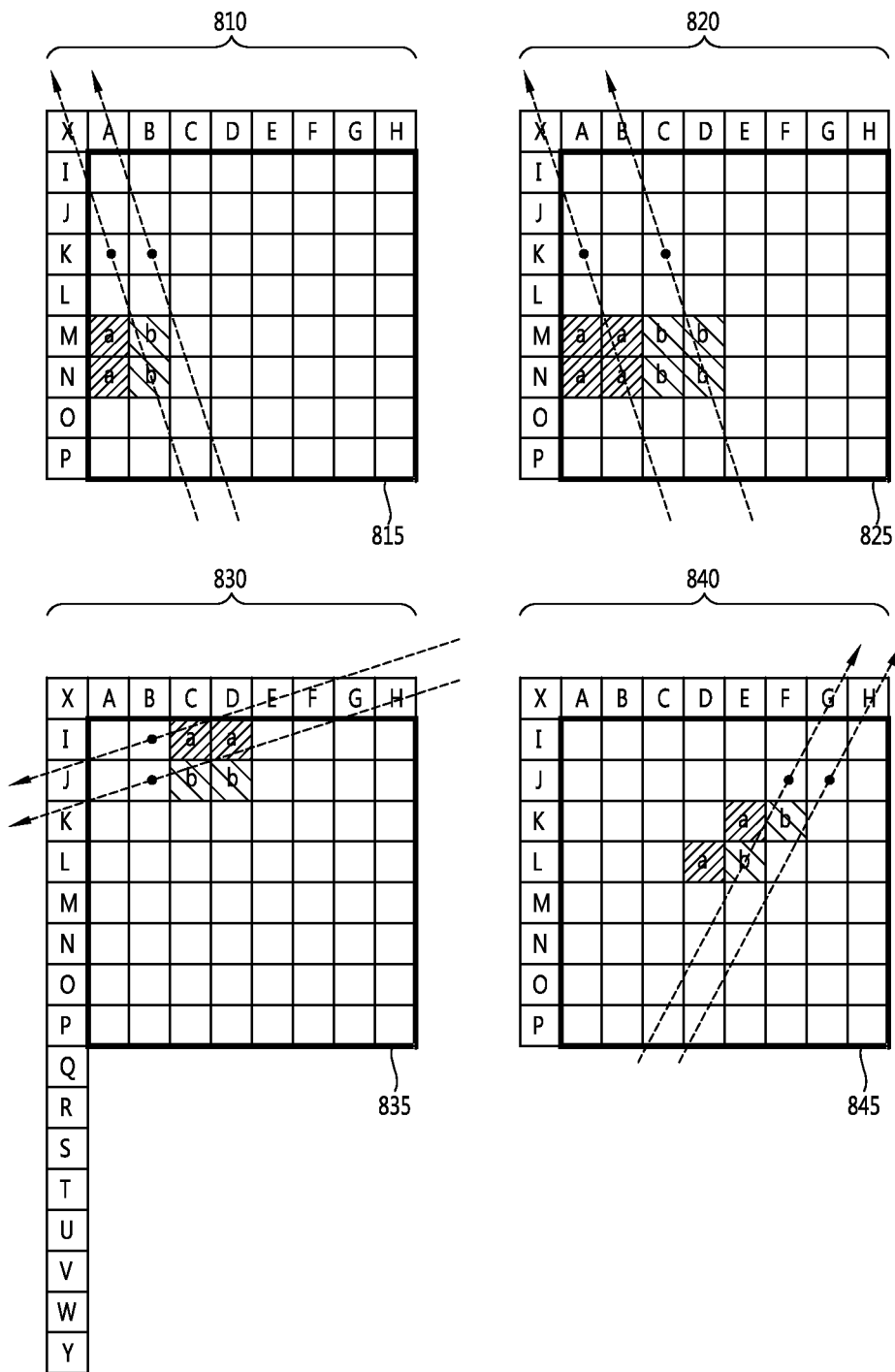
FIG. 8 is a conceptual view schematically showing another embodiment of a method for determining a representative position of each sample group according to an embodiment of the present invention.

FIG. 8 is a conceptual view schematically showing another embodiment of a method for determining a representative position of each sample group according to an embodiment of the present invention.

In FIGS. 8, 815, 825, 835, and 845 represent encoding target blocks, respectively, and the size of the respective encoding target blocks is assumed to be 8×8. In 810, 830, and 840 in FIG. 8, two pixels represented by 'a' may constitute a single sample group, and in 620 in FIG. 6, four pixels represented by 'a' may constitute a single sample group. Also, pixels represented by 'b' may also constitute a sample group in the same manner, respectively.

As mentioned above, when it is determined to apply multi-sample prediction, the encoder may determine a representative position with respect to each sample group in the encoding target block. Here, the representative position may be determined according to, for example, positions of the plurality of samples constituting each sample group. In this case, the encoder may determine a position existing outside the sample group within the encoding target block, as a representative position with respect to the sample group.

With reference to 810, 820, 830, and 840 in FIG. 8, the encoder may determine the position of the sample existing outside the 'a' sample group within the encoding target block, as a representative position with respect to the 'a' sample group. For example, in 810 in FIG. 8, when coordinates of two samples of the 'a' sample group are [x,y], [x,y+1], respectively, the representative position may be [x, y−2]. Also, the encoder may determine the position of the sample existing outside the 'b' sample group within the encoding target block, as a representative position with respect to the 'b' sample group. For example, in 820 in FIG. 8, when coordinates of two samples of the 'b' sample group are [x+1,y], [x+1, y+1], respectively, the representative position may be determined to be [x+1, y−2]. In FIG. 8, the representative position with respect to the 'a' sample group and the representative position with respect to the 'b' sample group are illustrated as black dots.

Figure 9:
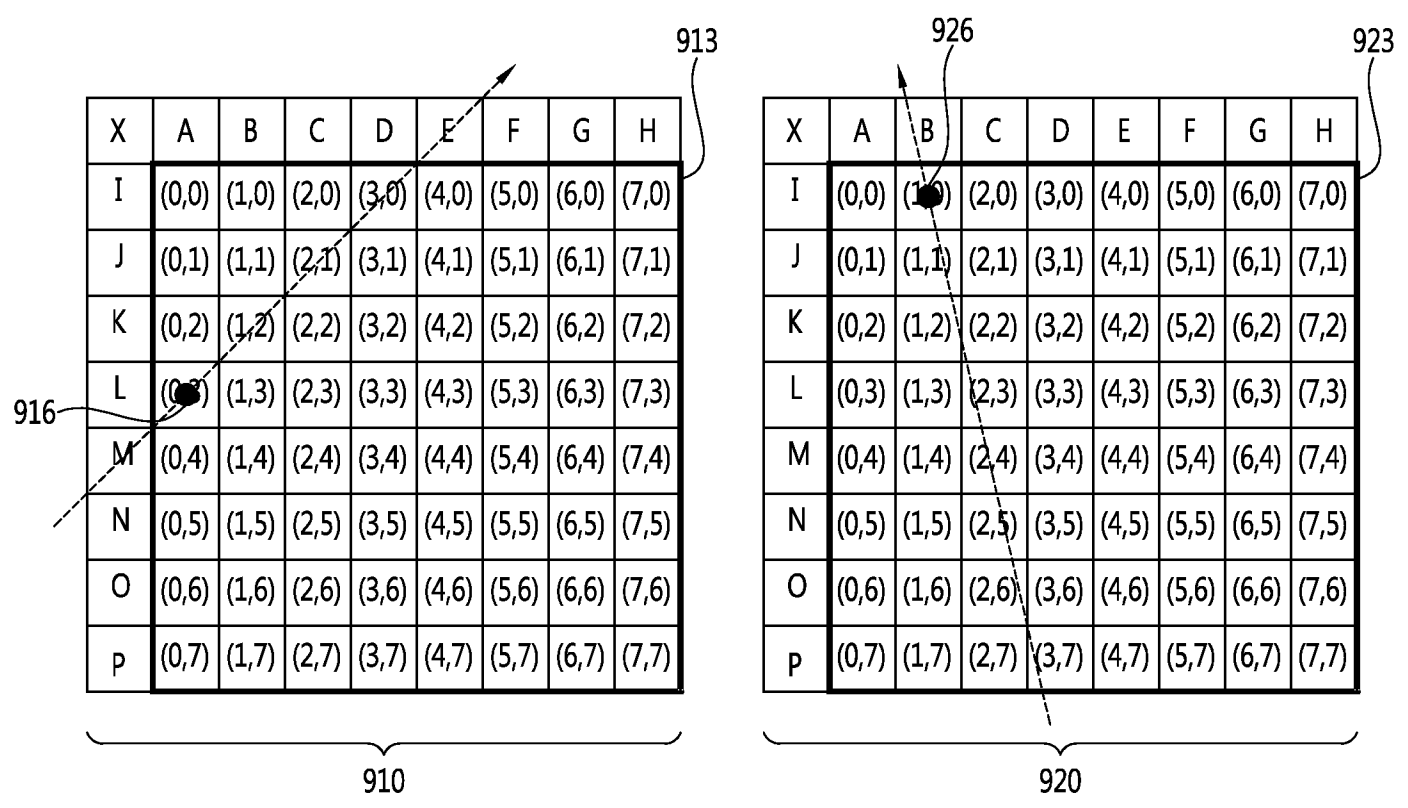

FIG. 9 is a conceptual view schematically showing an embodiment of a method of determining a representative prediction value of each sample group.

In FIGS. 9, 913 and 923 represent encoding target blocks, respectively, and the size of the encoding target blocks is assumed to be 8×8. In FIG. 9, [x,y] indicated within the encoding target blocks may represent coordinates of samples within the respective encoding target blocks. Also dark dots 916 and 926 indicated in 910 and 920 may denote respective positions, respectively.

As mentioned above, the encoder may determine a representative prediction value with respect to each sample group based on the representative positions with respect to each sample group.

In this case, the encoder may determine a reference sample used for calculating a representative prediction value based on a prediction mod and/or prediction direction of the encoding target blocks. Here, each prediction mode and/or prediction direction may have a corresponding angle. The encoder may determine a reference position corresponding to the representative position based on the angle, and determined whether or not the determined reference position corresponds to an integer position. Here, the reference position may corresponding to the same position as the position of a single reference sample, or may correspond to a position between a plurality of reference samples. Also, the integer position may refer to a position that can be indicated by coordinates of [n,m] (n and m are integers). Namely, when the reference position corresponds to an integer position, the reference position may be the same as the position of the single reference sample.

With reference to 910 in FIG. 9, the reference position corresponding to the representative position 916 may be an integer position. Here, a sample value of the reference sample existing in the integer position may be determined as a representative prediction value corresponding to the representative position 916.

For example, when the representative position 916 is [0,3], a reference sample value of the integer position corresponding to the representative position 916 may be E. Here, the encoder may determine E as a representative prediction value with respect to the representative position 916. This may be expressed by Equation 1 shown below.

$$predRep[0,3] = E \qquad \text{[Equation 1]}$$

Here, predRep[x,y] may indicate a representative prediction value with respect to the representative position of [x,y].

With reference to 920 in FIG. 9, a reference position corresponding to the representative position 926 may not be an integer position. For example, when the representative position 926 is [1,0], a reference position corresponding to the representative position 926 may be a position existing between a reference sample A of an integer position and a reference sample B of an integer position. Namely, when the reference position corresponding to the representative position 926 [1,0] is not an integer position, the plurality of reference samples (A,B) may correspond to the representative position 926.

In this case, in an embodiment of the present invention, among the plurality of reference samples corresponding to the representative position, the encoder may determine a sample value of a reference sample closer to the prediction direction of the representative position, as a representative prediction value corresponding to the representative position. For example, in the embodiment of 920 in FIG. 9, when it is assumed that the reference sample B is positioned to be closer to the prediction direction of the representative position 926 than the reference sample A does, the encoder may determine the reference sample B as a representative prediction value corresponding to the representative position 926. This may be expressed by Equation 2 shown below.

$$predRep[1,0]=B \qquad \text{[Equation 2]}$$

In another embodiment, when the reference position corresponding to the representative position is not an integer position, the encoder may determine a representative prediction value with respect to the representative position by perform interpolation on the sample values of the plurality of reference samples corresponding to the representative position. For example, as in 920 in FIG. 9, when the representative position 926 is [1,0], the reference samples corresponding to the representative position 926 are A and B, the encoder may derive a representative prediction value by performing interpolation by using a decimal distance between the reference sample A and the reference sample B. This may be expressed by Equation 3 shown below:

$$predRep[1,0]=((32-iFact)*A+iFact*B+16)>>5 \qquad \text{[Equation 3]}$$

Here, iFact may indicate a decimal distance between the reference sample A and the reference sample B. Also, A may indicate a sample value of the reference sample A, and B may indicate a sample value of the reference sample B. According to the embodiment of Equation 3, the encoder may perform interpolation between the plurality of reference samples with accuracy of 1/32.

iFact may be derived by using a certain angle and/or a certain initial angle. Here, the certain angle and the certain initial angle may correspond to values obtained by expressing a distance of 1/32 unit in the form of an angle (namely, the certain angle and the certain initial angle may correspond to distance values of 1/32 unit, which are expressed in the form of an angle), and may be set to be different for each intra prediction mode. Table 3 below shows an embodiment of angles and initial angles according to intra prediction modes.

TABLE 3

| Prediction mode set | 1 | 2 | 3 | 4 | 5 | 6 | 7 |
|---|---|---|---|---|---|---|---|
| Angle | 2 | 5 | 9 | 13 | 17 | 21 | 26 |
| Initial angle | 1 | 2 | 4 | 6 | 8 | 10 | 13 |

Here, the prediction mode set may indicate a group comprised of intra prediction modes having the same angle and the same initial angle. When the reference position corresponding to the representative position is not an integer position, iFact value may be derived by using a value obtained by the angle value and the initial angle value according to the intra prediction mode of the encoding target block.

Also, in another embodiment, when the reference position corresponding to the representative position is not an integer position, the encoder may determine an average value of a plurality of reference samples corresponding to the representative position, as a representative prediction value with respect to the representative position. For example, in 920 in FIG. 9, when the representative position 926 is [1,0] and reference samples corresponding to the representative position 926 are A and B, the encoder may determine a sample average value of the reference sample A and the reference sample B, as a representative prediction value corresponding to the representative position 926. This may be expressed by Equation 4 shown below.

$$predRep[1,0]=(A+B+1)>>1 \qquad \text{[Equation 4]}$$

When the representative prediction value corresponding to the representative position is determined, the encoder may determine a sample prediction value with respect to each of the plurality of samples of the sample group corresponding to the representative position by using the determined representative prediction value. For example, a prediction value with respect to each of the plurality of samples constituting a single sample group may be determined to be the same value as the representative prediction value corresponding to the sample group. Namely, the representative prediction value may be used as a prediction value of the plurality of samples of the corresponding sample group. Hereinafter, embodiments of a method of driving a prediction value with respect to a plurality of samples of a sample group will be described.

Figure 10:
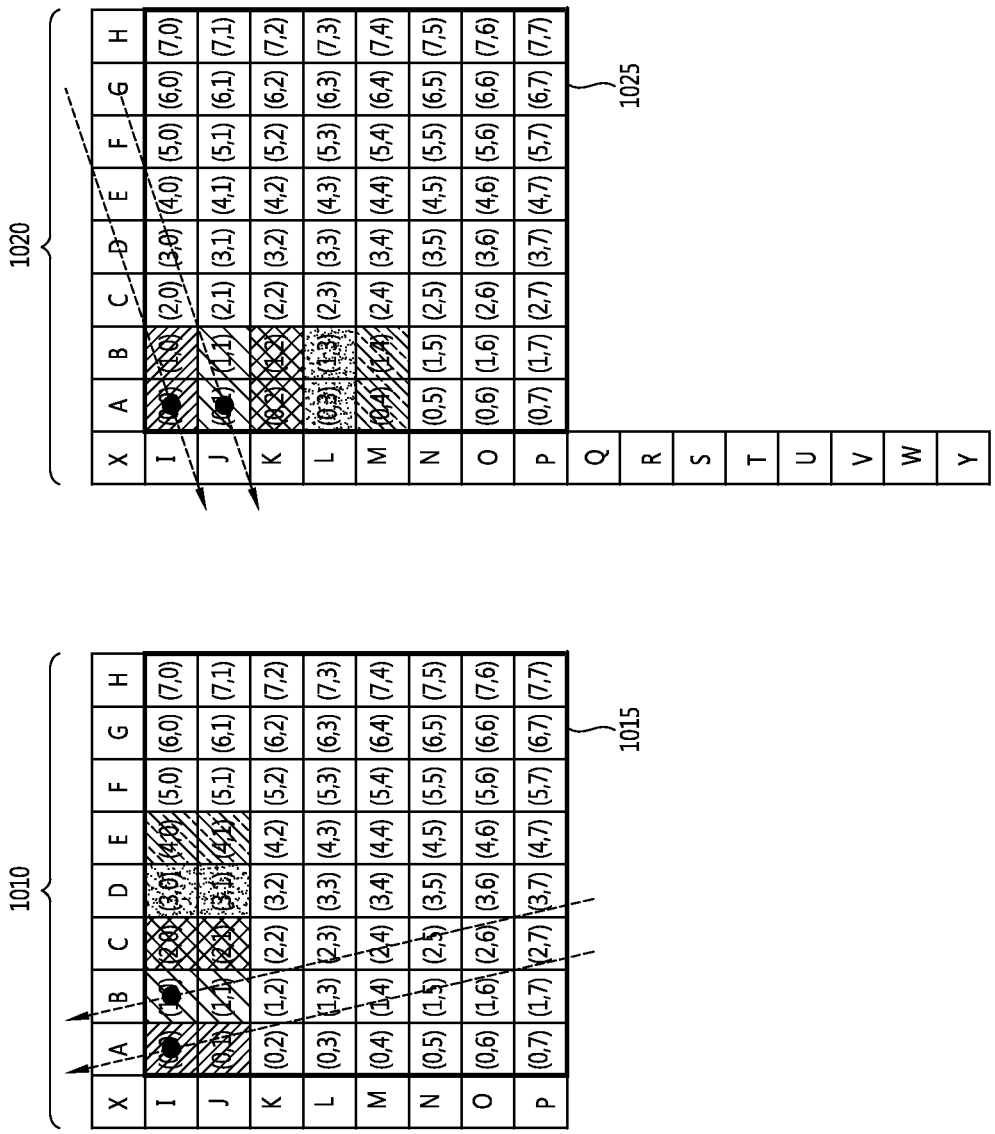
FIG. 10 is a conceptual view schematically showing an embodiment of a method of deriving a prediction value with respect to a plurality of samples of a sample group.

FIG. 10 is a conceptual view schematically showing an embodiment of a method of deriving a prediction value with respect to a plurality of samples of a sample group.

FIG. 10 illustrates an embodiment in which a representative position with respect to a single sample group is determined as a position of a single sample among a plurality of samples constituting the sample group. Namely, the embodiment illustrated in FIG. 10 may correspond to the embodiment illustrated in FIGS. 6. 1015 and 1025 in FIG. 10 represent encoding target blocks, respectively, and the size of the respective encoding target blocks is assumed to be 8×8. In FIG. 10, [x,y] indicated within the encoding target blocks may represent coordinates of samples within the respective encoding target blocks.

In 1010 in FIG. 10, {[0,0], [0,1]}, {[1,0], [1,1]}, {[2,0], [2,1]}, {[3,0], [3,1]}, {[4,0], [4,1]} may represent a single sample group, respectively, and in 1020 in FIG. 10, {[0,0], [1,0]}, {[0,1], [1,1]}, {[0,2], [1,2]}, {[0,3], [1,3]}, {[0,4], [1,4]} may represent a single sample group, respectively. In 1010 in FIG. 10, [0,0] indicated by a black dot may denote a representative position with respect to a sample group {[0,0], [0,1]}, and [1,0] indicated by a black dot may denote a representative position with respect to a sample group {[1,0], [1,1]}. Also, in 1020 in FIG. 10, [0,0] indicated by a black dot may denote a representative position with respect to a sample group {[0,0], [1,0]}, and [0,1] indicated by a black dot may denote a representative position with respect to a sample group {[0,1], [1,1]}.

In this case, the encoder may determine a representative prediction value corresponding to a single sample group, as a prediction value with respect to the plurality of samples of the sample group. For example, in 1010 in FIG. 10, the representative position with respect to the sample group {[1,0], [1,1]} is [1,0], so the encoder may determine a representative prediction value with respect to the representative position [1,0], as a prediction value of the samples positioned at the coordinates [1,0] and [1,1]. This may be expressed by Equation 5 shown below.

predSamples[1,0]=predSamples[1,1]=predRep[1,0]  [Equation 5]

Here, predSamples[x,y] may represent a prediction value of the sample positioned at the coordinates [x,y].

When the foregoing content is generalized, in 1010 in FIG. 10, the representative with respect to the sample group {[x,y], [x,y+1]} may be [x,y]. In this case, the encoder may determined a representative prediction value with respect to the representative position [x,y], as a prediction value of the sample positioned at the coordinates [x,y] and [x,y+1]. This may be expressed by Equation 6 shown below.

predSamples[$x,y$]=predSamples[$x,y$+1]=predRep[$x,y$]  [Equation 6]

Also, in 1020 in FIG. 10, a representative position with respect to the sample group {[x,y], [x+1,y]} may be [x,y]. In this case, the encoder may determined a representative prediction value with respect to the representative position [x,y], as a prediction value of the sample positioned at the coordinates [x,y] and [x+1,y]. This may be expressed by Equation 7 shown below.

predSamples[$x,y$]=predSamples[$x$+1,$y$]=predRep[$x,y$]  [Equation 7]

Figure 11:
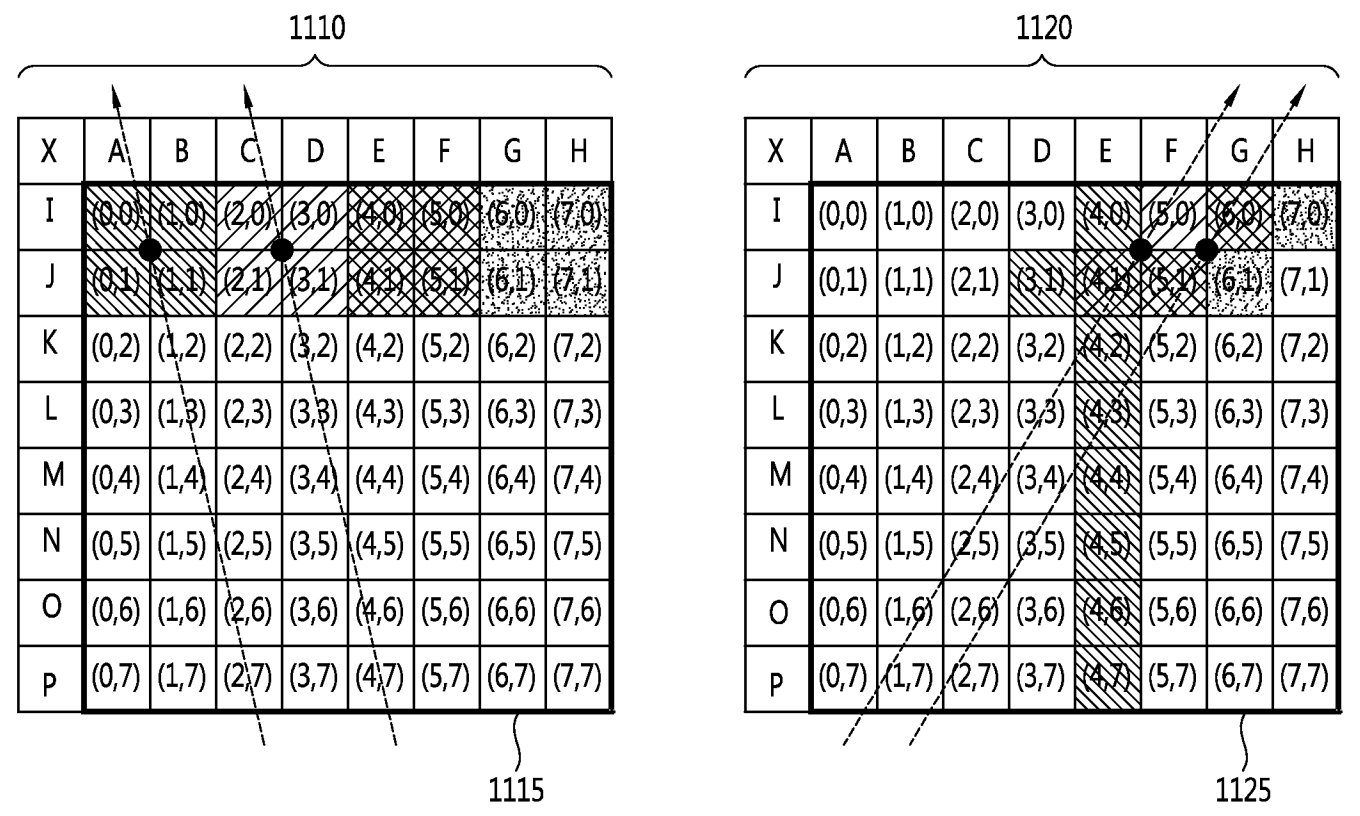

FIG. 11 is a conceptual view schematically showing another embodiment of a method of deriving a prediction value with respect to a plurality of samples of a sample group.

FIG. 11 illustrates an embodiment in which a representative position with respect to a single sample group is determined as a middle position of the plurality of samples constituting the sample group. Namely, the embodiment illustrated in FIG. 11 may correspond to the embodiment illustrated in FIGS. 7. 1115 and 1125 in FIG. 11 represent encoding target blocks, respectively, and the size of the respective encoding target blocks is assumed to be 8×8. In FIG. 11, [x,y] indicated within the encoding target blocks may represent coordinates of samples within the respective encoding target blocks.

In 1110 in FIG. 11, {[0,0], [0,1], [1,0], [1,1]}, {[2,0], [2,1], [3,0], [3,1]}, {[4,0], [4,1], [5,0], [5,1]}, {[6,0], [6,1], [7,0], [7,1]} may represent a single sample group, respectively, and in 1120 in FIG. 11, {[3,1], [4,0]}, {[4,1], [5,0]}, {[5,1], [6,0]}, {[6,1], [7,0]} may represent a single sample group, respectively. In 1110 in FIG. 11, a black dot indicated at the middle position of coordinates [0,0], [0,1], [1,0], [1,1] may represent a representative position with respect to the sample group {[0,0], [0,1], [1,0], [1,1]}, and a black dot indicated at the middle position of coordinates [2,0], [2,1], [3,0], [3,1] may represent a representative position of the sample group {[2,0], [2,1], [3,0], [3,1]}. Also, in 1120 in FIG. 11, a black dot indicated at the middle position of coordinates [4,1], [5,0] may represent a representative position with respect to the sample group {[4,1], [5,0]}, and a black dot indicated at the middle position of coordinates [5,1], [6,0] may represent a representative position with respect to the sample group {[5,1], [6,0]}.

In this case, the encoder may determine a representative prediction value corresponding to a single sample group, as a prediction value with respect to a plurality of samples of the sample group.

In 1110 in FIG. 11, a representative position with respect to a sample group {[x,y], [x,y+1], [x+1,y], [x+1,y+1]} may be [x+0.5, y+0.5]. In this case, the encoder may determine a representative prediction value with respect to the representative position [x+0.5, y+0.5], as a prediction value of the samples positioned at the coordinates [x,y], [x,y+1], [x+1,y], [x+1,y+1]. This may be expressed by Equation 8 shown below.

predSamples[$x,y$]=predSamples[$x,y$+1]=predSamples[$x$+1,$y$]=predSamples[$x$+1,$y$+1]=predRep[$x$+0.5, $y$+0.5]  [Equation 8]

Also, in 1120 in FIG. 11, a representative position with respect to the sample group {[x,y], [x−1,y+1]} may be [x−0.5, y+0.5]. In this case, the encoder may determine a representative prediction value with respect to the representative position [x−0.5, y+0.5], as a prediction value of the samples positioned at the coordinates [x,y], [x−1,y+1]. This may be expressed by Equation 9 shown below.

predSamples[$x,y$]=predSamples[$x$−1,$y$+1]=predRep[$x$−0.5,$y$+0.5]  [Equation 9]

Figure 12:
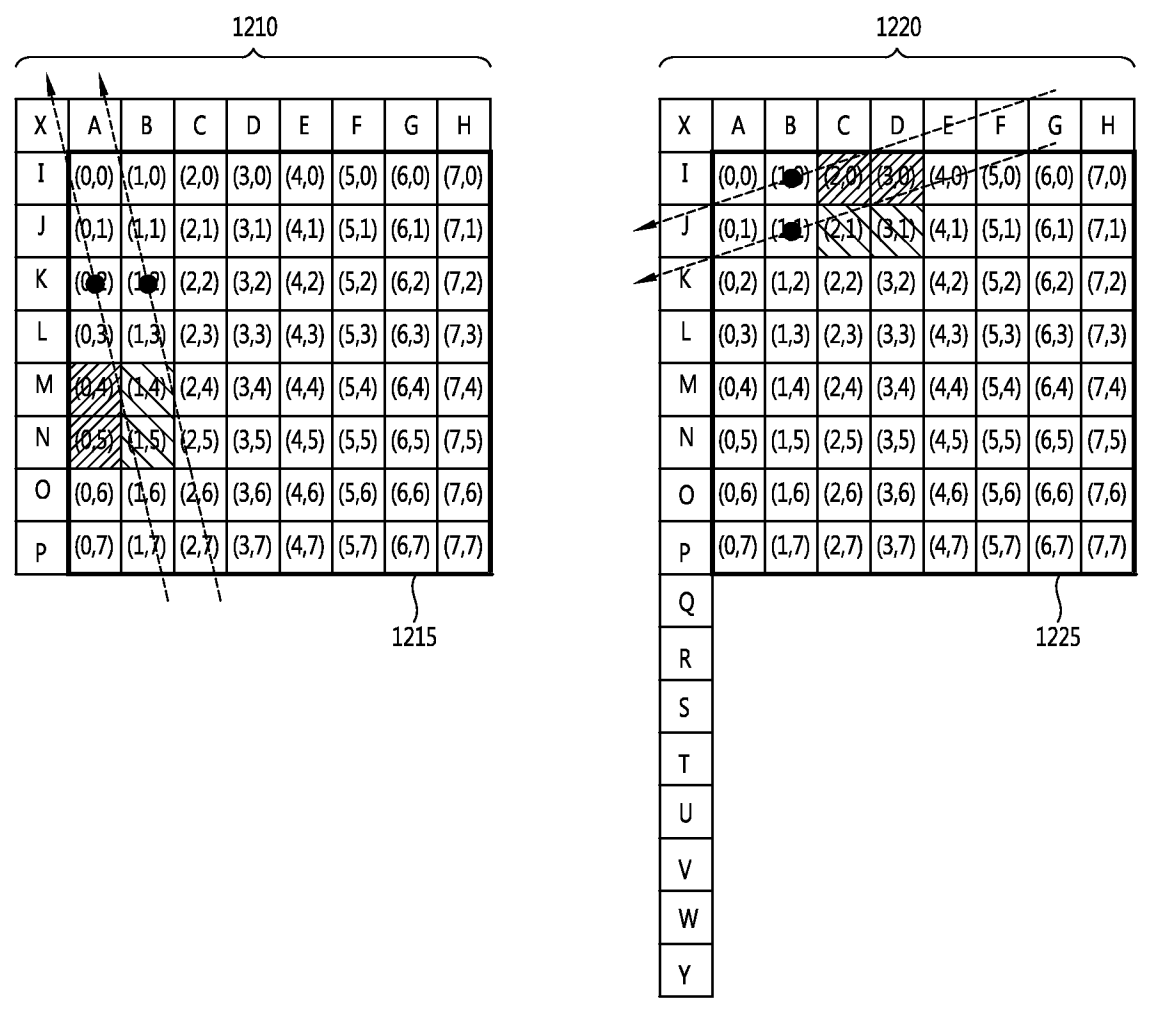

FIG. 12 is a conceptual view schematically showing another embodiment of a method of deriving a prediction value with respect to a plurality of samples of a sample group.

FIG. 12 illustrates an embodiment in which a representative position with respect to a single sample group is determined as a position existing outside the sample group within an encoding target block. Namely, the embodiment illustrated in FIG. 12 may correspond to the embodiment illustrated in FIGS. 8. 1215 and 1225 in FIG. 12 represent encoding target blocks, respectively, and the size of the respective encoding target blocks is assumed to be 8×8. In FIG. 12, [x,y] indicated within the encoding target blocks may represent coordinates of samples within the respective encoding target blocks.

In 1210 in FIG. 12, {[0,4], [0,5]}, {[1,4], [1,5]} may represent a single sample group, respectively, and in 1220 in FIG. 12, {[2,0], [3,0]}, {[2,1], [3,1]} may represent a single sample group, respectively.

In 1210 in FIG. 12, a black dot indicated at the position of coordinates [0,2] may represent a representative position with respect to the sample group {[0,4], [0,5]}, and a black dot indicated at the position of coordinates [1,2] may represent a representative position of the sample group {[1,4], [1,5]}. Also, in 1220 in FIG. 12, a black dot indicated at the position of coordinates [1,0] may represent a representative position with respect to the sample group {[2,0], [3,0]}, and a black dot indicated at the position of coordinates [1,1] may represent a representative position with respect to the sample group {[2,1], [3,1]}.

In this case, the encoder may determine a representative prediction value corresponding to a single sample group, as a prediction value with respect to a plurality of samples of the sample group.

In 1210 in FIG. 12, a representative position with respect to the sample group {[x,2*y], [x,2*y+1]} may be [x,y]. In this case, the encoder may determine a representative prediction value with respect to the representative position [x,y], as a prediction value of the sample positioned at the coordinates [x,2*y], [x,2*y+1]. This may be expressed by Equation 10 shown below.

predSamples[$x,2*y$]=predSamples[$x,2*y$+1]=predRep[$x,y$]  [Equation 10]

Also, in 1220 in FIG. 12, a representative position with respect to the sample group {[2*x,y], [2*x+1,y]} may be [x,y]. In this case, the encoder may determine a representative prediction value with respect to the representative position [x,y], as a prediction value of the sample positioned at the coordinates [2*x,y], [2*x+1,y]. This may be expressed by Equation 11 shown below.

$$\text{predSamples}[2*x,y]=\text{predSamples}[2*x+1,y]=\text{predRep}[x,y] \quad \text{[Equation 11]}$$

According to an embodiment of the present invention, a plurality of samples of a sample group corresponding to the representative prediction value can be predicted at a time through the single interpolation process for deriving the representative prediction value. Thus, the number of times of performing the interpolation process can be reduced, and both the amount of calculation and complexity can also be reduced.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

The embodiments of the present invention have been described with reference to the accompanying drawings, and it will be apparent to those skilled in the art that various modifications and variations can be made in the present invention without departing from the scope of the invention. Thus, the technical idea of the present invention should be interpreted to embrace all such alterations, modifications, and variations in addition to the accompanying drawings.

What is claimed is:

1. An image decoding method performed by an image decoding apparatus, comprising:
   determining that multi-sample prediction is applied to a current block based on an intra prediction mode of the current block, the current block being a prediction unit to which the intra prediction mode is applied;
   determining a representative prediction value for a sample group, the sample group being a region inside the current block, being smaller than the current block, and being predicted as the same representative prediction value;
   predicting a plurality of samples included in the sample group using the determined representative prediction value;
   generating a prediction block of the current block based on the determined representative prediction value; and
   reconstructing the current block based on the prediction block and a residual block of the current block,
   filtering the reconstructed current block based on an in-loop filter;
   wherein the representative prediction value is computed using reference sample values of a plurality of reference samples,
   wherein other samples inside the current block which are not included in the sample group are predicted differently from the plurality of samples included in the sample group,
   wherein the multi-sample prediction is performed based on a determination of whether the size of the current block is less than 32×32, and
   wherein the residual block of the current block is obtained by decoding a bitstream.

2. The image decoding method of claim 1, wherein a size of the sample group is determined based on the size of the current block.

3. An image encoding method performed by an image encoding apparatus, comprising:
   determining that multi-sample prediction is applied to a current block based on an intra prediction mode of the current block, the current block being a prediction unit to which the intra prediction mode is applied;
   determining a representative prediction value for a sample group, the sample group being a region inside the current block, being smaller than the current block, and being predicted as the same representative prediction value;
   predicting a plurality of samples included in the sample group using the determined representative prediction value;
   generating a prediction block of the current block based on the determined representative prediction value;
   generating a residual block of the current block based on the prediction block;
   reconstructing the current block based on the prediction block and the residual block of the current block; and
   filtering the reconstructed current block based on an in-loop filter,
   wherein the representative prediction value is computed using reference sample values of a plurality of reference samples,
   wherein other samples inside the current block which are not included in the sample group are predicted differently from the plurality of samples included in the sample group,
   wherein the multi-sample prediction is performed based on a determination of whether the size of the current block is less than 32×32, and
   wherein the residual block of the current block is encoded into a bitstream.

4. The image encoding method of claim 3, wherein a size of the sample group is determined based on a size of the current block.

5. A non-transitory computer-readable recording medium storing a bitstream which is received and decoded by an image decoding apparatus and used to reconstruct an image,
   wherein the bitstream comprises information on an intra prediction mode of a current block and information on a residual block of the current block;
   the information on an intra prediction mode of the current block is used to generate an intra prediction mode of the current block;
   the intra prediction mode of the current block is used to determine that multi-sample prediction is applied to the current block, the current block being a prediction unit to which the intra prediction mode is applied;
   wherein a representative prediction value for a sample group is determined, the sample group being a region inside the current block, being smaller than the current block, and being predicted as the same representative prediction value;
   the determined representative prediction value is used to predict a plurality of samples included in the sample group and to generate a prediction block of the current block;
   the information on the residual block of the current block is used to generate the residual block of the current block;
   the prediction block and the residual block of the current block are used to reconstruct the current block; and wherein filtering is performed for the reconstructed current block based on an in-loop filter;
wherein the representative prediction value is computed using reference sample values of a plurality of reference samples,
wherein other samples inside the current block which are not included in the sample group are predicted differently from the plurality of samples included in the sample group, and
wherein the multi-sample prediction is performed based on a determination of whether the size of the current block is less than 32×32.

* * * * *